US012167238B2

(12) United States Patent
Raman et al.

(10) Patent No.: US 12,167,238 B2
(45) Date of Patent: Dec. 10, 2024

(54) ESTABLISHMENT OF BATTERY-FREE INSERT ACCESS TO SECURE NETWORK

(71) Applicant: B/E AEROSPACE, INC., Winston Salem, NC (US)

(72) Inventors: Varun Raman, The Hague (NL); Hans Huijsing, Ijsselstein (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 268 days.

(21) Appl. No.: 17/556,732

(22) Filed: Dec. 20, 2021

(65) Prior Publication Data

US 2022/0201474 A1 Jun. 23, 2022

Related U.S. Application Data

(60) Provisional application No. 63/129,031, filed on Dec. 22, 2020.

(51) Int. Cl.
*H04W 12/06* (2021.01)
*H04L 9/40* (2022.01)

(52) U.S. Cl.
CPC .................................. *H04W 12/06* (2013.01)

(58) Field of Classification Search
CPC ...... H04L 63/105; H04W 12/06; H04W 88/08
See application file for complete search history.

(56) References Cited

U.S. PATENT DOCUMENTS

| 9,137,123 | B2 | 9/2015 | Birkmann et al. |
| 9,716,999 | B2 | 7/2017 | Zhang et al. |
| 10,015,137 | B2 * | 7/2018 | Courteille ........... H04L 63/0227 |
| 10,384,802 | B2 | 8/2019 | Ferrer et al. |
| 10,410,075 | B2 | 9/2019 | Zebley et al. |

(Continued)

FOREIGN PATENT DOCUMENTS

| AU | 2011230592 A1 | 10/2012 |
| EP | 3715252 A1 | 9/2020 |

(Continued)

OTHER PUBLICATIONS

Hassija et al., "Fast, Reliable, and Secure Drone Communication: A Comprehensive Survey," IEEE Communications Surveys & Tutorials Year: 2021 | vol. 23, Issue: 4 | Journal Article | Publisher: IEEE.*

(Continued)

*Primary Examiner* — Roderick Tolentino
(74) *Attorney, Agent, or Firm* — SNELL & WILMER L.L.P.

(57) ABSTRACT

A method is provided for establishing secure network communication for a wireless network module of a battery-free insert. The method includes establishing communication with a low security module of an access point of a secure network, wherein a timestamp is not used to establish the communication with the low security module, obtaining a timestamp from the low security module, discontinuing communication with the low security module, and sending a request to a high security module to establish communication with the high security module of the access point. The request includes the timestamp. Communication is established with the high security module using the timestamp for establishing high security communication with the secure network.

18 Claims, 4 Drawing Sheets

(56) References Cited

U.S. PATENT DOCUMENTS

| | | | |
|---|---|---|---|
| 10,798,549 B1 | 10/2020 | Reed et al. | |
| 2006/0050306 A1* | 3/2006 | Fujisawa | G06F 3/1222 |
| | | | 358/1.6 |
| 2008/0263380 A1* | 10/2008 | Dryer | G06F 1/14 |
| | | | 713/400 |
| 2010/0299742 A1* | 11/2010 | Declety | H04L 63/0209 |
| | | | 726/13 |
| 2012/0262270 A1* | 10/2012 | McNally | G06Q 10/00 |
| | | | 340/5.21 |
| 2015/0289299 A1 | 10/2015 | Abraham et al. | |
| 2017/0374555 A1* | 12/2017 | RoyChowdhury | H04W 12/128 |
| 2018/0027025 A1* | 1/2018 | Ma | H04L 63/205 |
| | | | 726/7 |
| 2018/0222588 A1 | 8/2018 | Bajorat et al. | |
| 2019/0007879 A1* | 1/2019 | Baek | H04W 36/00835 |
| 2020/0028687 A1 | 1/2020 | Castet et al. | |
| 2020/0112543 A1* | 4/2020 | Weed | H04L 63/1466 |
| 2020/0382372 A1* | 12/2020 | Easwar Prasad | H04L 67/10 |
| 2023/0141323 A1* | 5/2023 | Liu | H04W 40/04 |
| | | | 370/329 |

FOREIGN PATENT DOCUMENTS

| | | |
|---|---|---|
| WO | WO-2006106393 A2 | 10/2006 |
| WO | WO-2018140659 A1 | 8/2018 |

OTHER PUBLICATIONS

Joumessi-Demeffo et al., "Performance Trade-Offs of an Optical Wireless Communication Network Deployed in an Aircraft Cockpit," IEEE Open Journal of the Communications Society Year: 2020 | vol. 1 | Journal Article | Publisher: IEEE.*

Extended European Search Report and Written Opinion for European Patent Application No. EP21215921.4, dated May 19, 2022.

* cited by examiner

ESTABLISHMENT OF BATTERY-FREE INSERT ACCESS TO SECURE NETWORK

CROSS REFERENCE TO RELATED APPLICATIONS

This application claims priority to U.S. Patent Application Ser. No. 63/129,031 filed Dec. 22, 2020, which is incorporated herein by reference in its entirety.

FIELD OF THE DISCLOSURE

The present disclosure relates to establishment of a network connection for a battery-free insert, and more particularly to establishment of a secure network connection for a battery-free insert.

BACKGROUND

Inserts are modular appliances (e.g., ovens, water heaters, beverage chillers, espresso machines) or monuments (e.g., furniture, such as seats) that can be inserted into an infrastructure of the aircraft (or other physical system) for use. The infrastructure can provide an interface, such as to power, plumbing, structural support. Inserts are intentionally removable and can be used on multiple aircraft. Aircraft are progressing towards use of connected inserts, which refers to inserts that can connect to a computer network. For example, a connected insert can connect to an access point (AP) of an aircraft in which it is installed, which provides access to the aircraft's network and possibly to additional networks that are external to the aircraft's network.

The aircraft's network can be a secure network, in which case the AP would require a certificate for authentication of the connected insert before allowing access to the secure network. The required certificate would need a timestamp. However, the connected insert may not have a real-time clock to provide the timestamp. Further, the connected insert may not have a battery to operate a real-time clock for several reasons, including that regulations forbid use of batteries with inserts.

Conventional methods and systems have generally been considered satisfactory for their intended purposes. However, there is still a need in the art for an improved aircraft networking system that allows a connected insert to connect to a secure aircraft network. The present disclosure provides a solution for this need.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in accordance with one aspect of the disclosure, a wireless network module of a battery-free aircraft insert configured for insertion into an aircraft is provided.

The wireless network module includes a memory configured to store a plurality of programmable instructions and at least one processing device in communication with the memory. Upon execution of the plurality of programmable instructions, the at least one processing device is configured to establish communication with a low security module of an access point, wherein a timestamp is not needed to establish the communication with the low security module. A timestamp is obtained from the low security module and communication is discontinued with the low security module if needed for establishing communication with the high security module. A request with the timestamp is sent to a high security module to establish communication with the high security module of the access point. Communication is established with the high security module using the timestamp for establishing high security communication with an aircraft network of the aircraft.

In one or more embodiments, the at least one processing device, upon execution of the plurality of programmable instructions can be further configured to receive from the low security module an address of the high security module in response to a request for the timestamp, wherein the request to the high security module can be sent to the address of the high security module received from the low security module.

In one or more embodiments, the at least one processing device, upon execution of the plurality of programmable instructions can be further configured to receive authorization data that authorizes communication with the high security module, wherein the authorization data can be used to establish the communication with the high security module and/or the high security communication with the aircraft network.

In one or more embodiments, the at least one processing device, upon execution of the plurality of programmable instructions can be further configured to request the timestamp from the low security module.

In one or more embodiments, the at least one processing device, upon execution of the plurality of programmable instructions can be further configured to communicate with a networked device coupled to the aircraft network using the high security communication.

In one or more embodiments, wherein the at least one processing device, upon execution of the plurality of programmable instructions can be further configured to receive and store identification information identifying at least one of the aircraft, the low security module, the high security module, a device coupled to the aircraft network, a flight being performed by the aircraft, and an administrator associated with the aircraft network.

In one or more embodiments, the memory can further store the address of the high security module and/or the authorization data to the high security module for future use.

In accordance with a further aspect of the disclosure, a method is provided for establishing secure network communication for a wireless network module of a battery-free insert. The method includes establishing communication with a low security module of an AP of a secure network, wherein a timestamp is not used to establish the communication with the low security module, obtaining a timestamp from the low security module, discontinuing communication with the low security module, and sending a request to a high security module to establish communication with the high security module of the access point. The request includes the timestamp. Communication is established with the high security module using the timestamp for establishing high security communication with the secure network.

In one or more embodiments, the method can further include receiving from the low security module an address of the high security module in response to a request for the timestamp, wherein the request to the high security module can be sent to the address of the high security module received from the low security module.

In one or more embodiments, authorization data can be further received with the address of the high security module. The method can further include providing the authorization data to the high security module, and the authorization data can be used to establish communication with the high security module and/or the high security communication with the secure network.

In one or more embodiments, the method can further include requesting the timestamp from the low security module.

In one or more embodiments, the method can further include communicating with a networked device coupled to the secure network using the high security communication.

In one or more embodiments, the method can further include receiving identification information identifying at least one of an aircraft in which the insert is installed, the low security module, the high security module, a device coupled to the secure network, a flight being performed by the aircraft, and an administrator associated with the secure network and storing the identification information.

In one or more embodiments, method can further include storing the address of the high security module and/or the authorization data to the high security module for future use.

In another aspect of the disclosure, a system is provided. The system includes a battery-free aircraft insert and an access point. The insert includes a body and the wireless network module as disclosed. The AP includes a second memory configured to store a second plurality of programmable instructions and at least one second processing device in communication with the second memory. The at least one second processing device, upon execution of the second plurality of programmable instructions is configured to establish, by the low security module, communication, without using a timestamp, with the wireless network module, provide, by the low security module, the timestamp to the wireless network module in response to a request for the timestamp, receive, by the high security module, the request to the high security module with the timestamp from the wireless network module, establish, by the high security module, communication with the wireless network module in response to the request to the high security module and using the timestamp, and establish, by the high security module, communication between the wireless network module and the aircraft network.

In one or more embodiments, the at least one second processing device, upon execution of the second plurality of programmable instructions can be further configured to send to the wireless network module, by the low security module, an address of the high security module in response to the request for the time stamp.

In one or more embodiments, the at least one second processing device, upon execution of the second plurality of programmable instructions can be further configured to send to the wireless network module, by the low security module, authorization data that authorizes communication with the high security module. Establishing communication with the wireless network module and/or the high security communication with the aircraft network can use the authorization data.

In one or more embodiments, establishing communication between the wireless network module and the aircraft network by the high security module can include authorizing communicate with a networked device coupled to the aircraft network using the high security communication based on the authorization data.

In one or more embodiments, the at least one second processing device, upon execution of the second plurality of programmable instructions can be further configured to send to the wireless network module, by the high security module, identification information identifying at least one of the aircraft, the low security module, the high security module, a device coupled to the aircraft network, a flight being performed by the aircraft, and an administrator associated with the aircraft network.

In one or more embodiments, establishment of the secure communication between wireless network module and aircraft network can be in response to a request from the wireless network module or a request from another networked device coupled to aircraft network.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
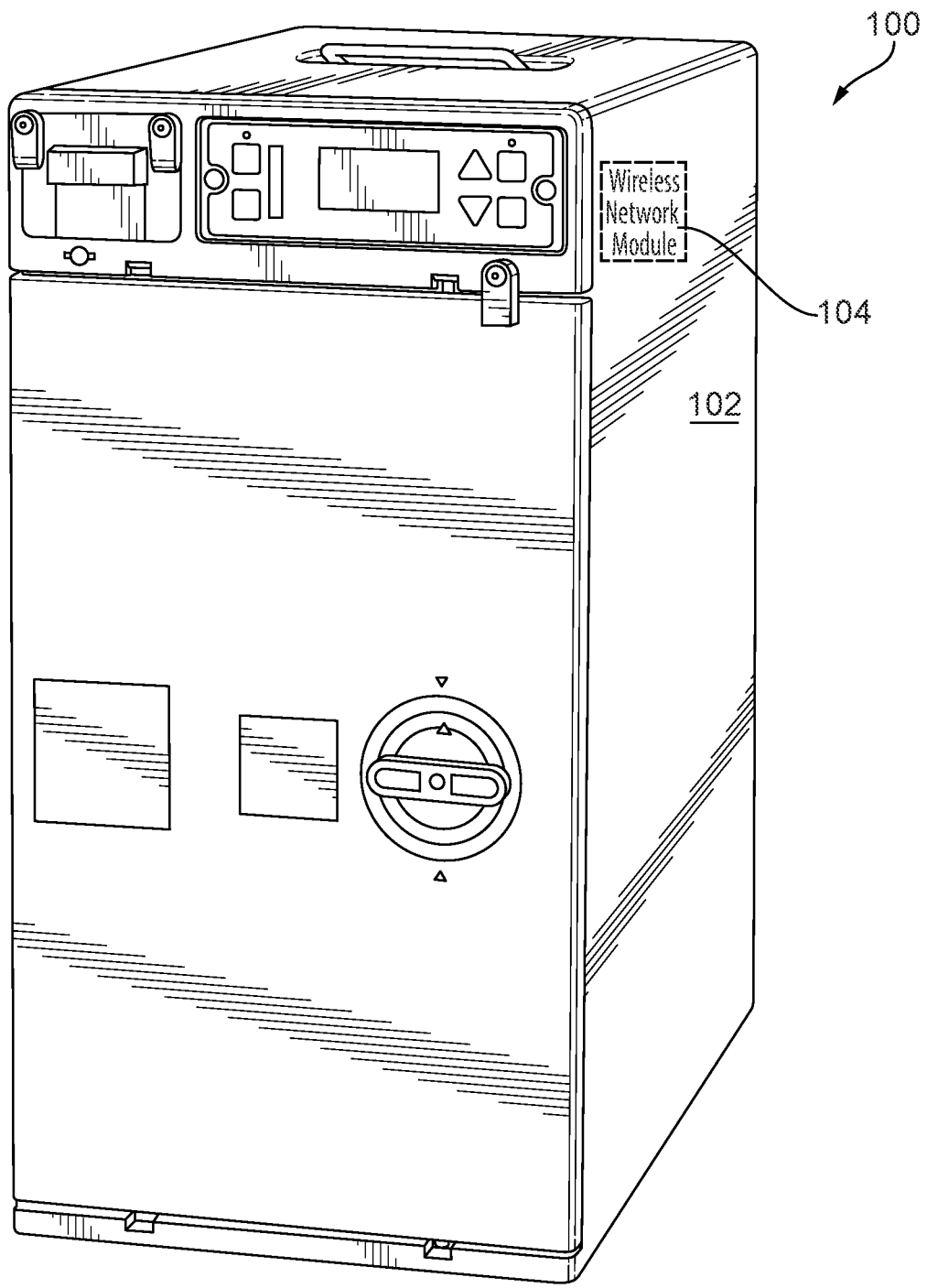
FIG. 1 is an illustrative view of an embodiment of an aircraft insert in accordance with this disclosure.

The illustrated embodiments are now described more fully with reference to the accompanying drawings wherein like reference numerals identify similar structural/functional features. The illustrated embodiments are not limited in any way to what is illustrated, as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this present disclosure belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "the signal" includes reference to one or more signals and equivalents thereof known to those skilled in the art, and so forth.

It is to be appreciated one or more of the illustrated embodiments discussed below include a software algorithm, program or code residing on computer useable medium having control logic for enabling execution on a machine having a computer processor. The machine typically includes memory storage configured to provide output from execution of the computer algorithm or program.

Reference will now be made to the drawings, in which like reference numerals identify similar structural features or aspects of the subject disclosure. For purposes of explanation and illustration, and not limitation, an illustrative view of an embodiment of an insert in accordance with the disclosure is shown in FIG. 1 and is designated generally by reference character 100. Other embodiments and/or aspects of this disclosure are shown in FIGS. 2 and 3.

Figure 2:
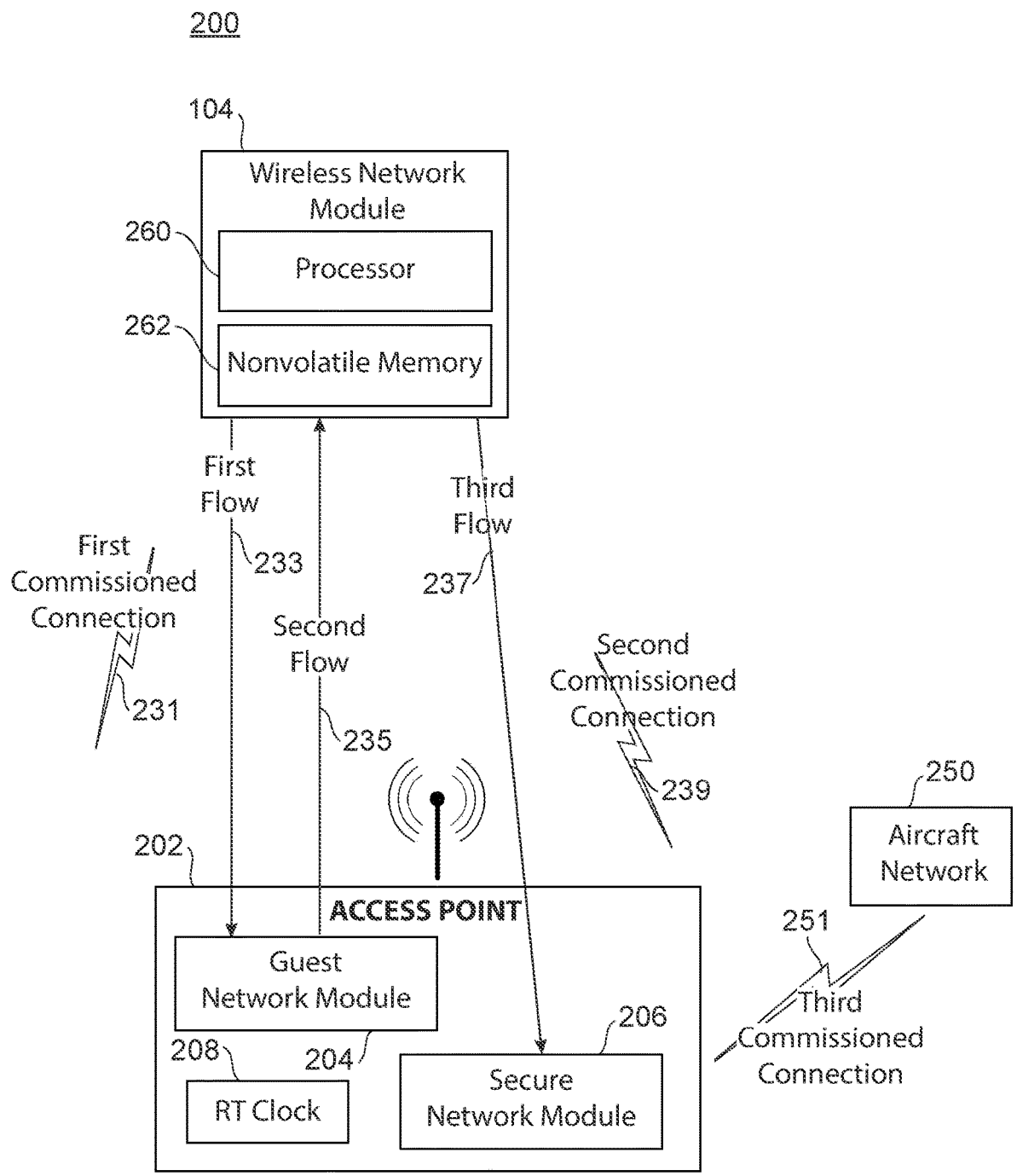
FIG. 2 is an illustrative view of an embodiment of a system in accordance with this disclosure.
Figure 3:
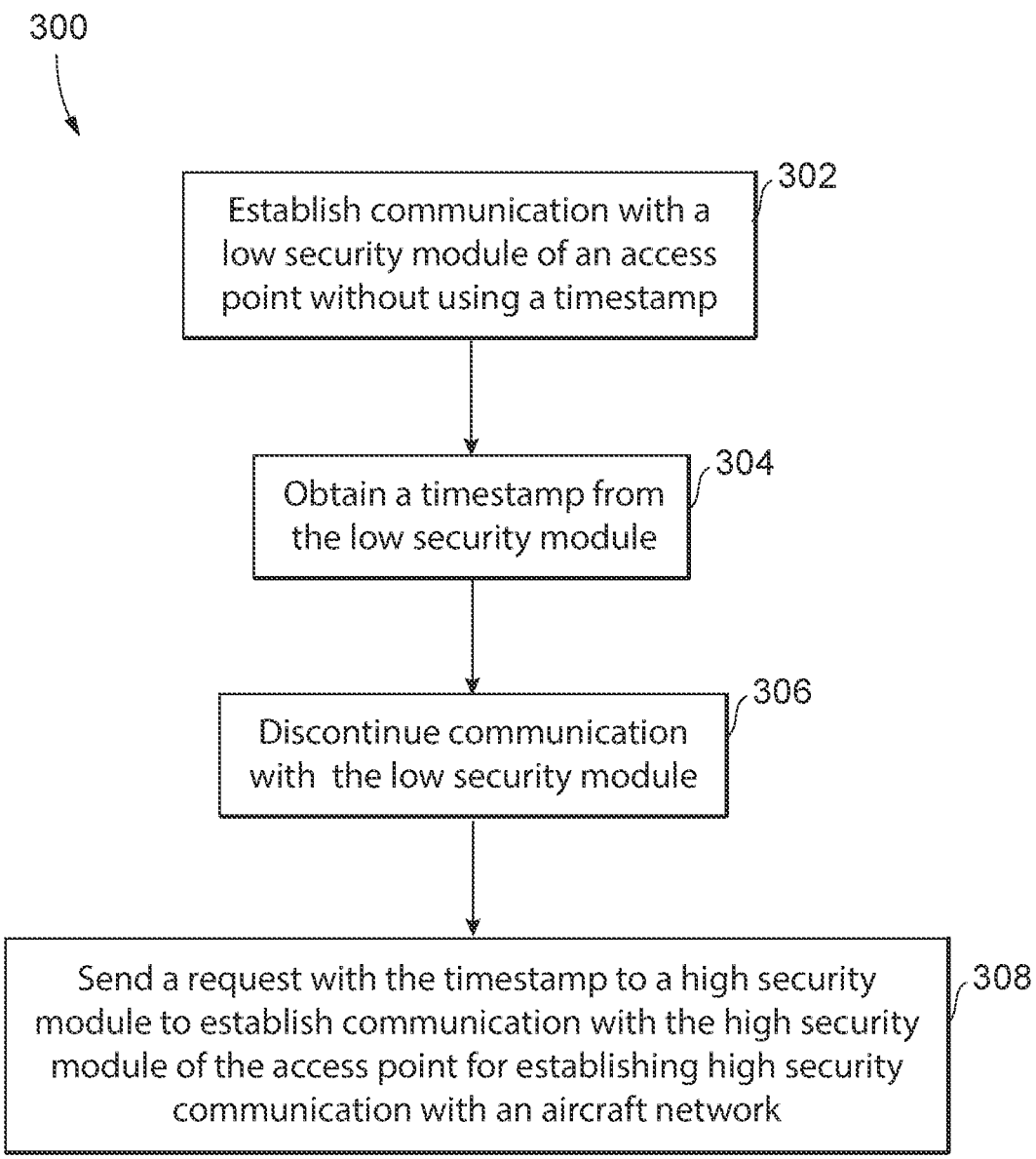
FIG. 3 is a flowchart of an example method of establishing secure network communication for a wireless network device of an aircraft insert in accordance with embodiments of the disclosure.

Referring to FIGS. 1 and 2, insert 100 is configured to connect to a secure network, such as an aircraft network 250, by establishing communication with an access point (AP) 202 that provides access, e.g., via Wi-Fi, by wireless devices to the secure network. Insert 100 includes a body 102 and a wireless network module 104. Wireless network module 104 is configured to establish secure communication with AP 202, which can take multiple commissioning processes. Once secure communication is established, wireless network module 104 can access aircraft network 250, e.g., to communicate with one or more networked devices over aircraft network 250. A range of networked devices with which wireless network module 104 can communicate can be in accordance with a level of permission assigned to wireless network module 104.

Secure communication, also referred to as highly secure communication, refers to communication that is established using a timestamp from a real time clock (RTC). A device that uses secure or high security communication requiring a timestamp from an RTC for establishment is referred to as a high security device or module. Non-secure communication or communication having lower security (referred to as low-secure communication) does not require establishment using a timestamp from an RTC. A device that uses non-secure or lower security communication that does not need a timestamp from an RTC for establishment is referred to as a low-security device or module.

Insert 100 is an insertable device that can be inserted into and removed from an interface of a system, such as an aircraft. For example, insert 100 can be an insertable device that can be inserted into the galley (or other area) of an aircraft, such as an oven, seat, toilet, etc. The interface can connect insert 100 to infrastructure of the aircraft, such as to a power bus, plumbing, a structure for structural support, etc. Insert 100 can be installed in multiple aircraft by physical insertion into a compatible interface of each aircraft, and can further be removed thereafter.

While the examples provided relate to insertion of insert 100 into an aircraft and establishment of communication between a wireless network module 104 of insert 100 and an AP 202 of aircraft network 250, the disclosure does not limit insertion of insert 100 into a particular system or establishment of communication with an AP 202 to a particular secure network. The disclosure envisions other system into which insert 100 can be inserted and other secure networks with which the wireless network module 104 can establish communication.

Once physically inserted into an interface of an aircraft, insert 100 can be connected to a power bus of the aircraft. Power from the power bus can provide power to wireless network module 104. Insert 100 is battery free and does not have access to power until it is inserted into an interface that connects to a power bus. Upon inserted into an interface that is connected to the power bus, wireless network module 104 can be powered-up. Insert 100 can be retrofitted with wireless network module 104 after manufacturing, or can be manufactured with wireless network module 104 integrated into insert 100.

As described in further detail below, since insert 100 does not receive power when it is not inserted into an interface that is connected to a power bus, insert 100 cannot operate a RTC. Accordingly, even once installed in an aircraft, wireless network module 104 cannot provide real time timestamps (e.g., date and time) that are needed to establish secure communication with an aircraft network of the aircraft.

Additionally, insert 100 may not include any user interface, display device, or graphical user interface (GUI) for entering or displaying information from or to a user. This increases the challenge of commissioning insert 100 for communication with the AP 202, since a user cannot instruct the insert 100 when to commission a communication interface, nor can a user enter identification, addressing, authentication, or authorization information to be used during a commissioning process. A commissioning process refers to a process for establishing communication, including exchanging any information needed for establishing the communication, also referred to as commissioning information.

Wireless network module 104 includes a processor and nonvolatile memory 202 (e.g., flash memory, ferroelectric random access memory (FRAM), electrically erasable programmable read-only memory (EEPROM)) that can store limited amounts of information. The information stored can include programmable instructions for execution by the processor. In addition, the memory of network module 104 can include commissioning information that can be used during one of the commissioning processes. Wireless network module 104 can further include any suitable hardware (e.g., a Wi-Fi card) and/or any suitable software module(s) (e.g., suitable Wi-Fi hosting and client firmware) configured to perform any and/or all suitable disclosed method(s)/function(s).

AP 202 is connected to the aircraft network 250 and acts as a central transmitter and receiver of wireless radio signals, allowing wireless devices to connect to aircraft network 250. AP 202 can include a router or can be coupled to the router in order to provide access to the aircraft network 250. AP 202 receives power from a power source, such as the power bus of the aircraft.

AP 202 includes the guest network module 204, a secure network module 206, and a RTC 208. AP 202 can be a networking hardware device that has a wired connection to, or is incorporated into, a router, switch, or hub (not shown) of aircraft network 250. AP 202 further projects a Wi-Fi signal within a designated area (e.g., the aircraft galley) to communicate with wireless devices (such as wireless network module 104) in the designated area using Wi-Fi to connect the wireless devices to the aircraft network. Guest network module 204 and secure network module 206 are hardware, software, or firmware devices that can be fully or partially integrated with one another.

Low-secure communication is established between guest network module 204 and network module 104 for providing low-secure communication with the aircraft network 250. Secure communication is established between secure network module 206 and network module 104 for providing secure communication with aircraft network 250. The low-secure communication requires first aircraft network data to authenticate the network module 104, but does not require a real time timestamp. The secure communication requires evidence of authorization (also referred to as a certificate), e.g., second aircraft network data, and further requires a real time timestamp.

RTC 208 is a device, such as an integrated circuit (IC), that measures the passage of time in order to keep accurate time that is represented by a real time signal output by RTC 208. Real time clock can receive power via a power bus of the AP 202 and/or an alternate source of power. The alternate source of power can provide power to RTC 208 even when the aircraft's power bus is off or unavailable. This alternate source can be a battery, such as a lithium battery or a supercapacitor.

A first commissioning process is used for wireless network module 104 to establish low-secure communication with guest network module 204. The first commissioning process is explained for completeness, but can be assumed to have been completed before commencement of the disclosed method.

The first commissioning process can be commenced by wireless network module 104 or the guest network module 204 sending a request to establish communication, wherein the request or the response to the request can include provision of first aircraft network data from wireless network module 104 to guest network module 204. The first aircraft network data can be obtained by wireless network module 104 and/or stored in nonvolatile memory 262 of the wireless network module 104.

The first aircraft network data includes authorization information that allows wireless network module 104 to establish communication with guest network module 204. For example, the first aircraft network data can include a guest network ID and a guest network password. In certain embodiments, the first aircraft network data can include information that can be used to generate a password, for example a seed value or algorithm parameters. For example, in certain embodiments, the password can be calculated from the insert serial number. In certain embodiments, the first aircraft network data can be default, constant network data (e.g., preset).

In one or more embodiments, the first aircraft network data could be stored in nonvolatile memory 202 (e.g. flash) during production. In one or more embodiments, the nonvolatile memory 202 can be configured at production or maintenance, or updated by an administrator, to store a list of candidates first aircraft network data entries for aircraft networks of different aircraft. Wireless network module 104 can attempt to establish communication with guest network module 204 by stepping through the list until one of the candidates first aircraft network data entries is successful in establishing communication with the guest network module 204. The successful candidate first aircraft network data entry can be marked in memory as having been successful and can be used for the first trial the next time the wireless network module 104 is powered up. In one nor more embodiments, the guest network module 204 on all aircraft of an airline company can be configured to use the same first aircraft network data.

First commissioned connection 231 is then established for limited less-secure access to guest network module 204 of AP 202 using the first aircraft network data. Any other suitable process for establishing first commissioned connection 231 using the disclosed embodiments is contemplated herein. In one or more embodiments, one or more operations for establishment of the first commissioning process by wireless network module 104 and/or guest network module 204 can be automated. In an example, first commissioned connection 231 can be established using an external device, such as a personal electronic device or laptop using wireless communication or that is connected to a communication port of the insert (not shown). In addition or alternatively, a user interface provided on the insert (not labeled) can be used, when available, to establish first commissioned connection 231.

Once the first commissioned connection 231 is established, the communication between wireless network module 104 and guest network module is low-secure and wireless network module 104 has very limited access to aircraft network 250. In order to be able to send and receive secure communications with aircraft network 250, wireless network module 104 is required to establish a secure connection with secure network module 206. However, establishment of the secure connection with secure network module 206 requires that wireless network module 104 provide a real time timestamp in addition to the second aircraft network data.

However, insert 100 may not have a RTC or the ability to provide a real time timestamp. Since insert 100 is a removable device that can be disconnected from the interface to the aircraft's power bus, a RTC would need a constant power source, such as a battery, to assure that the RTC continues operating even when insert 100 is powered off and/or removed from connection with the aircraft's power bus.

There are impediments and disadvantages to providing insert 100 with a battery. Batteries are currently forbidden for use in inserts. Even if batteries were allowed, batteries can have poor reliability and can be unsuitable for usage in low temperatures that can be required for some types of inserts. Usage of connectable inserts is increasing, such that an aircraft could be configured with a large amount of connectable inserts (e.g., seats, toilets, etc.) that would each need to provide a timestamp. Management of batteries of all of these inserts, such as tracking status of the batteries and replacing batteries when needed, can be cumbersome. When configuring the inserts, variations in the initial timestamps of the different inserts could be introduced during configuration and further variations and inaccuracies could develop due to time drift during storage. Inserts could be configured in different time zones. Accounting for different time zones would add complexity to the second commissioning process.

The disclosed second commission process establishes secure communication between wireless network module 104 of insert 100 and aircraft network 150 via secure network module 206, although insert 100 does not have a battery to support a RTC. Programming instructions stored in nonvolatile memory 202 and executed by a processing device of wireless network module 104, when executed by the processing device can cause the second commissioning process to occur automatically without user intervention.

Once first commissioned connection 231 is established, wireless network module 104 obtains a timestamp from guest network module 204 at flow second 235. In one or more embodiments, wireless network module 104 requests by a first request the timestamp from guest network module 204 at flow first 233, and guest network module 204 sends the timestamp to wireless network module 104 at second flow 235 in response to the request. In one or more embodiments, guest network module 204 can automatically send the timestamp to wireless network module 104 upon establishment of first commissioned connection 231.

In one or more embodiments, in addition to receiving the timestamp, wireless network module 104 receives at flow 235 at least one of an address of secure network module 206 and authentication data needed to establish secure communication with at least one of secure network module 206 and aircraft network 250. In one or more embodiments, the address and authentication data can be provided automatically, such as upon establishment of first commissioned connection 231. In one or more embodiments, the address and authentication data can be provided in response to the first request or in response to another request for address and/or authentication data.

At third flow 237, wireless network module 104 sends a second request with the timestamp to the secure network module 206. Third flow 237 can be transmitted in response to receipt of information received at flow 235. Secure network module 206 establishes secure communication with wireless network module 104 at second commissioned connection 239 in response to the second request. Furthermore, secure network module 206 can establish secure communication between wireless network module 104 and aircraft network 250 via secure network module 206 via second and third commissioned connections 239 and 251, wherein third commissioned connection 251 between AP 202, and in particular secure network module 206, and aircraft network 250 is pre-established.

In one or more embodiments, establishment of the secure communication between wireless network module 104 and aircraft network 250 can be automatic in response to establishment of secure communication between wireless network module 104 and secure network module 206 at second commissioned connection 239. In one or more embodiments, establishment of the secure communication between wireless network module 104 and aircraft network 250 can be in response to a request from wireless network module 104 or another processing device coupled to aircraft network 250.

In one or more embodiments, wireless network module 104 can store the address of the secure network module 206 and/or the authentication data in its nonvolatile memory 202 for future use and automatic establishment of the second commissioned connection 239 without the need to obtain address or authentication information via flow 235. The authentication information can be stored in nonvolatile memory 202 during production or manufacturing, such as together with authentication for several secure networks with which the wireless network module 104 may be expected to establish communication.

Once communication between wireless network module 104 and aircraft network 250 is established, wireless network module 104 can communicate via the aircraft network 250 with one or more different networked processing devices (referred to as networked devices) coupled to the aircraft network 250 using the high security communication. The networked devices with which aircraft network 250 can communicate and the nature of the communication can be allowed or not allowed based on a level of authentication. The level of authentication can be based on the authentication data sent by wireless network module 104 to secure network module 206 and/or other authentication data sent by the networked devices.

Wireless network module 104 can receive and store (e.g., in flash memory of insert 100) identification information identifying at least one of the aircraft (e.g., tail number or other identifying information), guest network module 204, secure network module 206, any of the different devices coupled to the aircraft network with which communication takes place via third commissioned connection 251, a flight being performed by the aircraft (e.g., flight number), and an administrator associated with the aircraft network, for example and without limitation. The information stored by nonvolatile memory 202 can be stored for future use or stored in an error log when an attempt to establish communication with a high security device fails.

In one or more embodiments, wireless network module 104 can collect data from its internal components, such as operational information, health information, or error messages related to smart equipment included in insert 100 and store locally or transit to a networked device this information in association with the identification information. Additionally or internally, wireless network module 104 can receive information from networked devices, such as control signals and/or programming updates for the wireless network module 104 or the smart equipment included with insert 100. In another non-limiting example, wireless network module 104 and send messages to and/or receive messages from the networked devices for power negotiation communication.

With reference now to FIG. 3, shown is a flowchart demonstrating implementation of various exemplary embodiments of the disclosure. It is noted that the order of blocks shown in FIG. 3 is not required, so in principle, the various blocks may be performed out of the illustrated order or in parallel. Also certain blocks may be skipped, different blocks may be added or substituted, or selected blocks or groups of operations may be performed in a separate application following the embodiments described herein.

With reference to FIG. 3, a flowchart 300 is shown that illustrates an example method of the disclosure. At block 302, communication is established between a processing device of an insert and a low security module of an AP, without using a timestamp. The establishment of communication in block 302 is performed in a first commissioning process. The processing device of the insert can be, for example, wireless network module 104 of insert 100 shown in FIG. 1. The low security module of the AP can be, for example, guest network module 204 of AP 202, shown in FIG. 2.

A second commissioning process begins at block 304. At block 304, a timestamp is obtained by the processing device of the insert from the low security module. The timestamp can be obtained together with additional information, such as an address for a high security module, such as secure network module 206, shown in FIG. 2 and/or authorization data that authorizes communication with the high security module. Furthermore, the insert's processing device can store the additional information in nonvolatile memory for future use. At block 306, communication with the low security module is discontinued, since wireless network module 104 may only be allowed to establish communication with one network at a time. If block 306 is omitted, an attempt to communicate with secure network module 206 may fail. After several failed attempts, communication can continue with guest network module 204 and an error report can be generated.

The timestamp and additional information can be obtained automatically, without user intervention. For example, upon establishment of communication between the insert's processing device and the low security module, the insert's processing device can be configured to send a request to the low security module for the timestamp and/or additional information. Alternatively, the low security module can be configured to send the timestamp and/or additional information upon establishment of communication with the insert's processing device.

At block 308, the insert's processing device sends a request with the timestamp to the high security module to establish communication with the high security module. Block 308 can be automatically performed in response to receiving the timestamp and/or additional information. At block 310, communication between the insert's processing device and the high security module is established, completing the second commissioning process. The initiation and completion of the second commissioning process at blocks 308 and 310 can both be automatic, without the need for human intervention.

At block 312, communication between the insert's processing device and the aircraft network is established, completing the third commissioning process. The third commissioning process at block 312 can be automatic, without the need for human intervention. For example, the third commissioning process can be performed in response to completion of the second commissioning process. More particularly, since communication between the high security module and the aircraft network has been pre-established, once the insert's processing device has established communication with the high security module, the insert's processing device can automatically establish communication with the aircraft network and with networked devices coupled to the aircraft network, e.g., in a third commissioning process. In one or more embodiments, the third commissioning process can be performed in response to a request, such as a request from the wireless network module or a request from a networked device that is coupled to aircraft network.

In an example application, the insert's processing device can receive identification information from the low security module, the high security module, or the networked devices. The identification information can identify at least one of the aircraft, the low security module, the high security module, a networked device coupled to the aircraft network, a flight being performed by the aircraft, and an administrator associated with the aircraft network. The insert's processing device can store then identification information in nonvolatile memory and associate the identification information with other data, such as operational or health data sensed and/or measured by components of the insert.

Aspects of the present disclosure are described above with reference to block diagrams of methods, apparatus (systems) and computer program products according to embodiments of the disclosure. Features of the methods described include operations, such as equations, transformations, conversions, etc., that can be performed using software, hardware, and/or firmware. Regarding software implementations, it will be understood that individual blocks of the block diagram illustrations and combinations of blocks in the block diagram illustrations, can be implemented by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
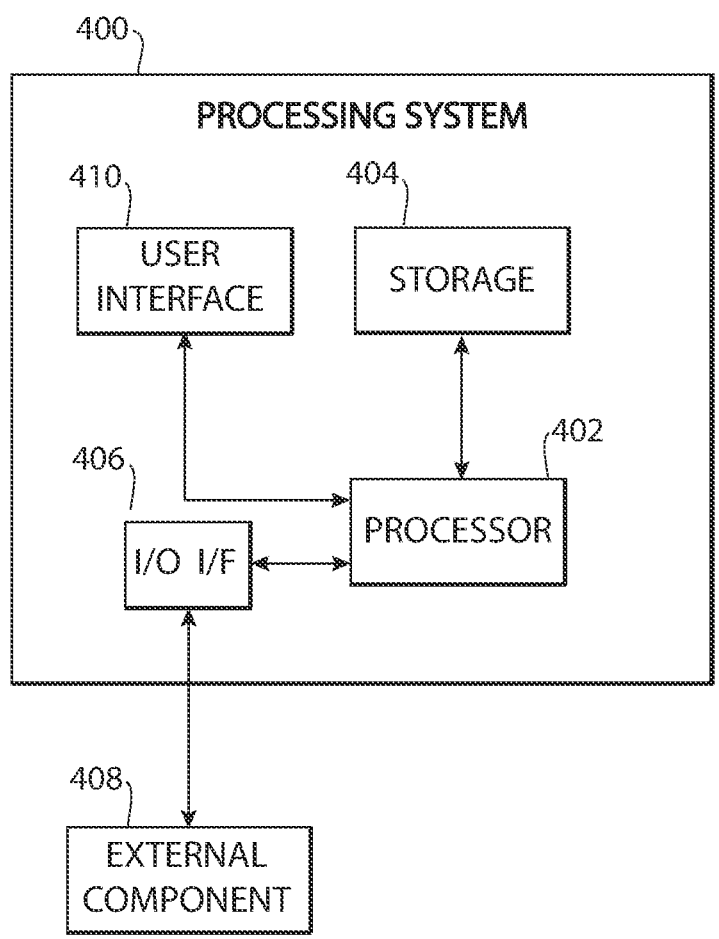
FIG. 4 is a block diagram of an exemplary computer system that implements a wireless network device of the aircraft insert shown in FIG. 1 and an access point shown in FIG. 2, in accordance with embodiments of the disclosure.

With reference to FIG. 4, a block diagram of an example computing system 500 is shown, which provides an example configuration of the wireless network module 104 and AP 202 (for supporting guest network module 204 and secure network module 206). Additionally, all or portions of the wireless network module 104, guest network module 204, and secure network module 206 could be configured as software, and computing system 400 could represent such portions. Computing system 400 is only one example of a suitable system and is not intended to suggest any limitation as to the scope of use or functionality of embodiments of the disclosure described herein. Computing system 400 can be implemented using hardware, software, and/or firmware. Regardless, computing system 400 is capable of being implemented and/or performing functionality as set forth in the disclosure.

Computing system 400 is shown in the form of a general-purpose computing device. Computing system 400 includes a processing device 402, memory 404, an input/output (I/O) interface (I/F) 406 that can communicate with an internal component, such as optionally a user interface 410 and optionally an external component 408.

The processing device 402 can include, for example, a Programmable Logic Device (PLD), microprocessor, DSP, a microcontroller, a field programmable gate array (FPGA), an application specific integrated circuit (ASIC), and/or other discrete or integrated logic circuitry having similar processing capabilities.

The processing device 402 and the memory 404 can be included in components provided in the FPGA, ASIC, microcontroller, or microprocessor, for example. Memory 404 can include, for example, volatile and nonvolatile memory for storing data temporarily or long term, and for storing programmable instructions executable by the processing device 402. Memory 404 can be a removable (e.g., portable) memory for storage of program instructions. I/O I/F 406 can include an interface and/or conductors to couple to the one or more internal components 410 and/or external components 408.

Embodiments of the wireless network module 104, guest network module 204, and secure network module 206 may be implemented or executed by one or more computer systems, such as a microprocessor. Each computer system 400 can be included within wireless network module 104 and AP 202, or multiple instances thereof. In the example shown, computer system 400 is embedded in wireless network module 104 and AP 202 for supporting guest network module 204 and secure network module 206. In various embodiments, computer system 400 may include one or more of a microprocessor, an FPGA, application specific integrated circuit (ASIC), microcontroller. The computer system 400 can be provided as an embedded device. Portions of the computer system 400 can be provided externally, such by way of a centralized computer, a data concentrator, a cockpit computing device controls display, or the like.

Computer system 400 is only one example of a suitable system and is not intended to suggest any limitation as to the scope of use or functionality of embodiments of the disclosure described herein. Regardless, computer system 400 is capable of being implemented and/or performing any of the functionality set forth hereinabove.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A wireless network module of a battery-free aircraft insert configured for insertion into an aircraft, the wireless network module comprising:
    a memory configured to store a plurality of programmable instructions; and
    at least one processing device in communication with the memory, wherein the at least one processing device, upon execution of the plurality of programmable instructions is configured to:
    establish communication with a low security module of an access point based on information stored in the memory, wherein a timestamp is not used to establish the communication with the low security module;
    obtain a real time timestamp from the low security module;
    discontinue communication with the low security module if needed for establishing communication with the high security module;
    send a request to a high security module of the access point to establish communication with the high security module, the request including the real time timestamp, wherein communication is established with the high security module using the real time timestamp for establishing high security communication with an aircraft network of the; and
    wherein the at least one processing device, upon execution of the plurality of programmable instructions is further configured to request the real time timestamp from the low security module.

2. The wireless network module of claim 1, wherein the at least one processing device, upon execution of the plurality of programmable instructions is further configured to receive from the low security module an address of the high security module in response to a request for the real time timestamp, wherein the request to the high security module is sent to the address of the high security module received from the low security module.

3. The wireless network module of claim 2, wherein the at least one processing device, upon execution of the plurality of programmable instructions is further configured to receive authorization data that authorizes communication with the high security module, wherein the authorization data is used to establish the communication with the high security module and/or the high security communication with the aircraft network.

4. The wireless network module of claim 1, wherein the at least one processing device, upon execution of the plurality of programmable instructions is further configured to communicate with a networked device coupled to the aircraft network using the high security communication.

5. The wireless network module of claim 1, wherein the at least one processing device, upon execution of the plurality of programmable instructions is further configured to receive and store identification information identifying at least one of the aircraft, the low security module, the high security module, a device coupled to the aircraft network, a flight being performed by the aircraft, and an administrator associated with the aircraft network.

6. The wireless network module of claim 5, wherein the memory further stores the address of the high security module, authorization data to the high security module for future use.

7. A method for establishing secure network communication for a wireless network module of a battery-free insert, the method comprising:
    establishing communication with a low security module of an access point of a secure network based on information stored in the memory, wherein a timestamp is not used to establish the communication with the low security module;
    obtaining a real time timestamp from the low security module;
    discontinuing communication with the low security module;

sending a request to a high security module to establish communication with the high security module of the access point, the request including the real time timestamp, wherein communication is established with the high security module using the real time timestamp for establishing high security communication with the secure network; wherein the method further comprises requesting the real time timestamp from the low security module.

8. The method of claim 7, wherein the method further comprises receiving from the low security module an address of the high security module in response to a request for the real time timestamp, wherein the request to the high security module is sent to the address of the high security module received from the low security module.

9. The method of claim 8, wherein authorization data is further received with the address of the high security module, and the method further comprise providing the authorization data to the high security module, and the authorization data is used to establish communication with the high security module and/or the high security communication with the secure network.

10. The method of claim 7, wherein the method further comprises communicating with a networked device coupled to the secure network using the high security communication.

11. The method of claim 7, wherein the method further comprises:

receiving identification information identifying at least one of an aircraft in which the insert is installed, the low security module, the high security module, a device coupled to the secure network, a flight being performed by the aircraft, and an administrator associated with the secure network; and storing the identification information.

12. The method of claim 9, wherein the method further comprises storing the address of the high security module and/or the authorization data to the high security module for future use.

13. A system, comprising: a battery-free aircraft insert comprising:

a body; and a wireless network module; and an access point comprising:

a second memory configured to store a second plurality of programmable instructions; and at least one second processing device in communication with the second memory, wherein the at least one second processing device, upon execution of the second plurality of programmable instructions is configured to:

establish, by the low security module, communication based information a nonvolatile memory, without using a timestamp, with the wireless network module;

provide, by the low security module, the real time timestamp to the wireless network module in response to a request for the real time timestamp;

receive, by the high security module, the request to the high security module with the real time timestamp from the wireless network module;

establish, by the high security module, communication with the wireless network module in response to the request to the high security module and using the real time timestamp;

establish, by the high security module, communication between the wireless network module and the aircraft network, wherein the communication with the low security module and the high security communication does not involve measurement of time by the aircraft insert; and wherein the method further comprises requesting the real time timestamp from the low security module.

14. The system of claim 13, wherein the at least one second processing device, upon execution of the second plurality of programmable instructions is further configured to send to the wireless network module, by the low security module, an address of the high security module in response to the request for the time stamp.

15. The system of claim 13, wherein the at least one second processing device, upon execution of the second plurality of programmable instructions is further configured to send to the wireless network module, by the low security module, authorization data that authorizes communication with the high security module, wherein establishing communication with the wireless network module and/or the high security communication with the aircraft network uses the authorization data.

16. The system of claim 15, wherein establishing communication between the wireless network module and the aircraft network by the high security module includes authorizing communicate with a networked device coupled to the aircraft network using the high security communication based on the authorization data.

17. The system of claim 16, wherein the at least one second processing device, upon execution of the second plurality of programmable instructions is further configured to send to the wireless network module, by the high security module, identification information identifying at least one of the aircraft, the low security module, the high security module, a device coupled to the aircraft network, a flight being performed by the aircraft, and an administrator associated with the aircraft network.

18. The system of claim 13, wherein establishment of the secure communication between wireless network module and aircraft network is in response to a request from the wireless network module or a request from another networked device coupled to aircraft network.

* * * * *